US007416489B2

(12) United States Patent
Smith, III

(10) Patent No.: US 7,416,489 B2
(45) Date of Patent: Aug. 26, 2008

(54) SYSTEM AND METHOD FOR SCORING, RANKING, AND AWARDING CASH PRIZES TO INTERACTIVE GAME PLAYERS

(76) Inventor: Jay Smith, III, 348 Bentel Ave., Los Angeles, CA (US) 90049

(*) Notice: Subject to any disclaimer, the term of this patent is extended or adjusted under 35 U.S.C. 154(b) by 430 days.

(21) Appl. No.: 10/841,768

(22) Filed: May 7, 2004

(65) Prior Publication Data

US 2004/0225387 A1 Nov. 11, 2004

Related U.S. Application Data

(60) Provisional application No. 60/468,761, filed on May 8, 2003.

(51) Int. Cl.
*A63F 13/00* (2006.01)
*G06F 19/00* (2006.01)

(52) U.S. Cl. ............................ 463/42; 463/41; 700/91; 700/92; 700/93

(58) Field of Classification Search .................. 463/29, 463/42; 700/91, 92, 93
See application file for complete search history.

(56) References Cited

U.S. PATENT DOCUMENTS 5,083,271 A * 1/1992 Thacher et al. ............... 700/92
5,684,526 A 11/1997 Yoshinobu ................... 348/13
5,917,725 A * 6/1999 Thacher et al. ............... 700/91
6,076,021 A * 6/2000 Houriet et al. ................ 700/93
7,143,132 B2 * 11/2006 Klein et al. ................. 709/203
2001/0019965 A1 * 9/2001 Ochi ........................... 463/25
2002/0115488 A1 * 8/2002 Berry et al. .................... 463/42
2002/0119824 A1 * 8/2002 Allen .......................... 463/42
2002/0173349 A1 * 11/2002 Ach, III ......................... 463/1
2002/0193162 A1 * 12/2002 Walker et al. ................. 463/42
2003/0068046 A1 * 4/2003 Lindqvist et al. ............ 380/277
2003/0093168 A1 * 5/2003 Nagaoka ...................... 700/91
2004/0152516 A1 * 8/2004 Blatter et al. ................. 463/42

* cited by examiner

*Primary Examiner*—Ronald Laneau
*Assistant Examiner*—Victor Cheung

(57) ABSTRACT

A method and system for computing scores and determining a winner between a plurality of users playing a plurality of different games on an interactive gaming network. Players are sequentially assigned to a player group as they initially log on to the gaming network. Each player selects and plays a game to produce a present raw score value which is converted into a present ranked percentage score value by calculating the percentage of past raw score values for the selected game that are below the present raw score value. A handicap value is added to the present raw score value to determine a normalized game score that can be compared to the normalized game scores of other users playing the same or different games in any combination. An average of a minimum number of game scores are used to compare players within the same player group.

10 Claims, 16 Drawing Sheets

SYSTEM AND METHOD FOR SCORING, RANKING, AND AWARDING CASH PRIZES TO INTERACTIVE GAME PLAYERS

CROSS-REFERENCE TO RELATED APPLICATION

This application is based on U.S. Provisional Application No. 60/468,761 dated May 8, 2003.

FIELD OF THE INVENTION

This invention is related to gaming systems and more particularly to an interactive gaming system having the ability to compare player's scores between games having different scoring methods.

DESCRIPTION OF RELATED ART

Online gaming in various forms is becoming known in the industry. Typically, a first user of a gaming network will log on to play a selected game and receive a game-specific score value. That is, the game-specific score is only understandable in context with the particular game selected. A second user may log on to the game network and play a different game with a different scoring method from that selected by the first user. Since the players have selected different games with different scoring methods there has not been an efficient and fair way to compare the score values of the first user and the second user, or more generally to compare one player's results with another unless they are each playing the same game with the same scoring method.

This problem becomes even more acute when the players are competing for prizes such as cash or other items. In this case, it becomes even more important to be able to objectively compare the performance of one player with another in order to fairly dispense the winnings. Therefore, there remains a need for a fair, efficient, objective, and coherent system for allowing players to compete against other players and determine a winner even though the players may have selected different games with widely varying performance indicia.

SUMMARY OF THE INVENTION

The present invention, as defined in the claims, solves the problems mentioned above and more by providing an interactive television (iTV) gaming system including an adaptive scoring and ranking system that rewards players for success at games of skill regardless of the game or series of games selected by the user. In this gaming system, players are awarded non-game-specific game points where the traditional scoring for each of the available games is normalized into game points that may be compared among all players and all games. The present invention is particularly useful in interactive television wherein players can not only play individual games but can further compete to provide a score relative to other players over a period of time.

To provide a fair and competitive situation as well as to maintain player interest, players are formed into player groups, also called MINI LEAGUES(™), having a maximum number of people. The players are assigned to their respective player groups during their first access to the gaming network, upon logging in for the first time during the weekly competition period. Players are ranked against other players within their player group, and a player is rewarded according to a first reward pool based on achieving a high rank in comparison to the players of their own player group. A second reward pool is dispensed to the highest ranked players between groups. Hence, there are two levels of competition, first against players within a player group, and second against players between player groups.

In addition to each game's traditional scoring method, special game points called CASH CREDITS(™) can be assigned based on the player's performance. A maximum of 100 game points are earned for a perfect game. For example, in the game of Hearts, a perfect "Shoot the Moon" is worth 100 game points. In Solitaire, to finish the deck in a predetermined short time is worth 100 game points. In TETRIS(™), to build a solid wall on all levels is worth 100 game points. In Crosswords, to finish in the time allotted is worth 100 game points. Finally, in PACMAN(™), to finish all the screens without being caught is worth 100 game points. These games and results are only examples, and should not be considered to be limiting.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

Throughout the drawings, reference numbers are re-used to indicate correspondence between referenced elements. In addition, the first one or two digits of each reference number indicate the figure in which the element first appears, while the last two digits distinguish the element within the figure.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the intention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment.

Figure 1:
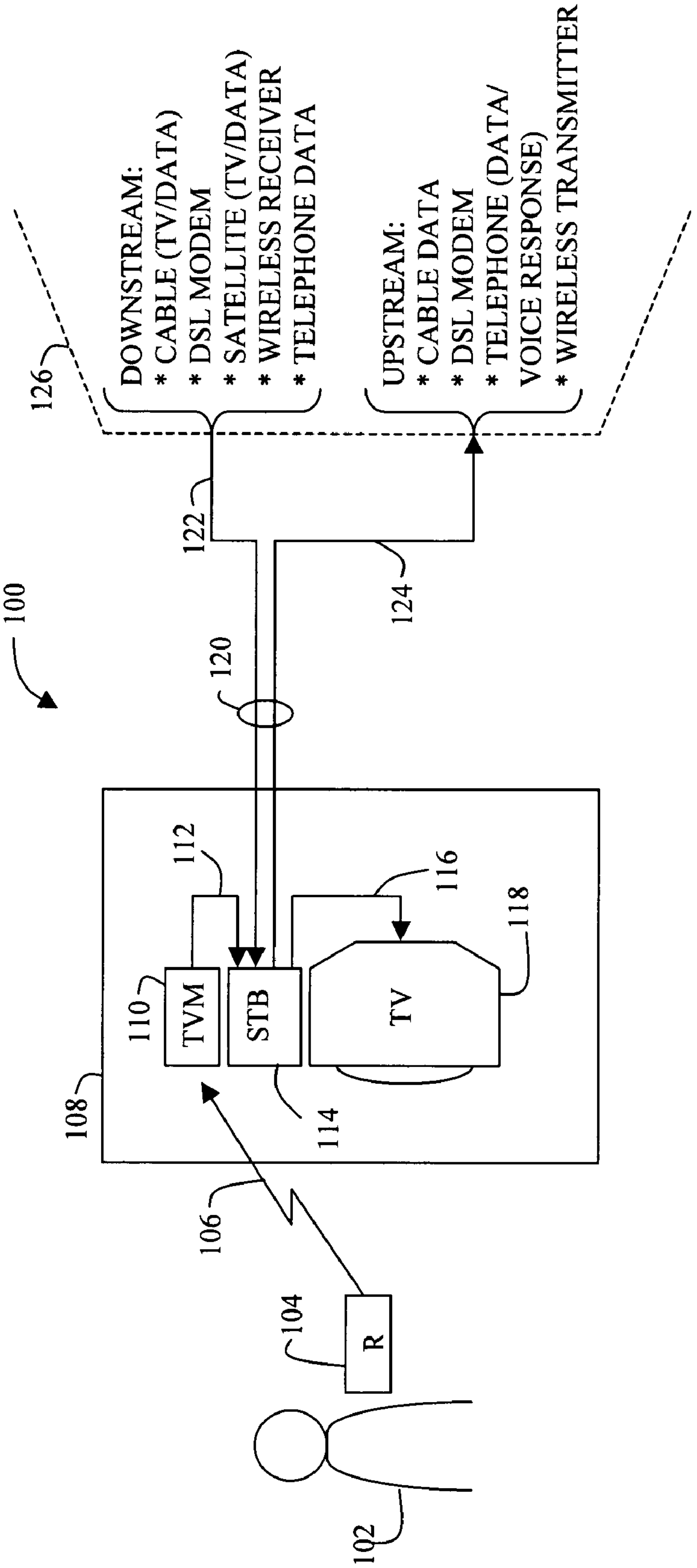
FIG. 1 is a diagram showing a gaming terminal for an interactive gaming system in accordance with an embodiment of the present invention.

In reference to FIG. 1, in one embodiment, a gaming access environment 100 allows a user 102 to play a selected interactive game on a gaming terminal 108. The user 102 operates a user input unit 104 in order to send a user input signal 106 to the gaming terminal 108. The user input unit 104 can be a hand-held remote control device, a keyboard, or a mouse, for example. The gaming terminal 108 includes a user input receiver unit 110 for receiving the user input signal and outputting a user received signal 112 to a network communication unit 114.

Figure 19:
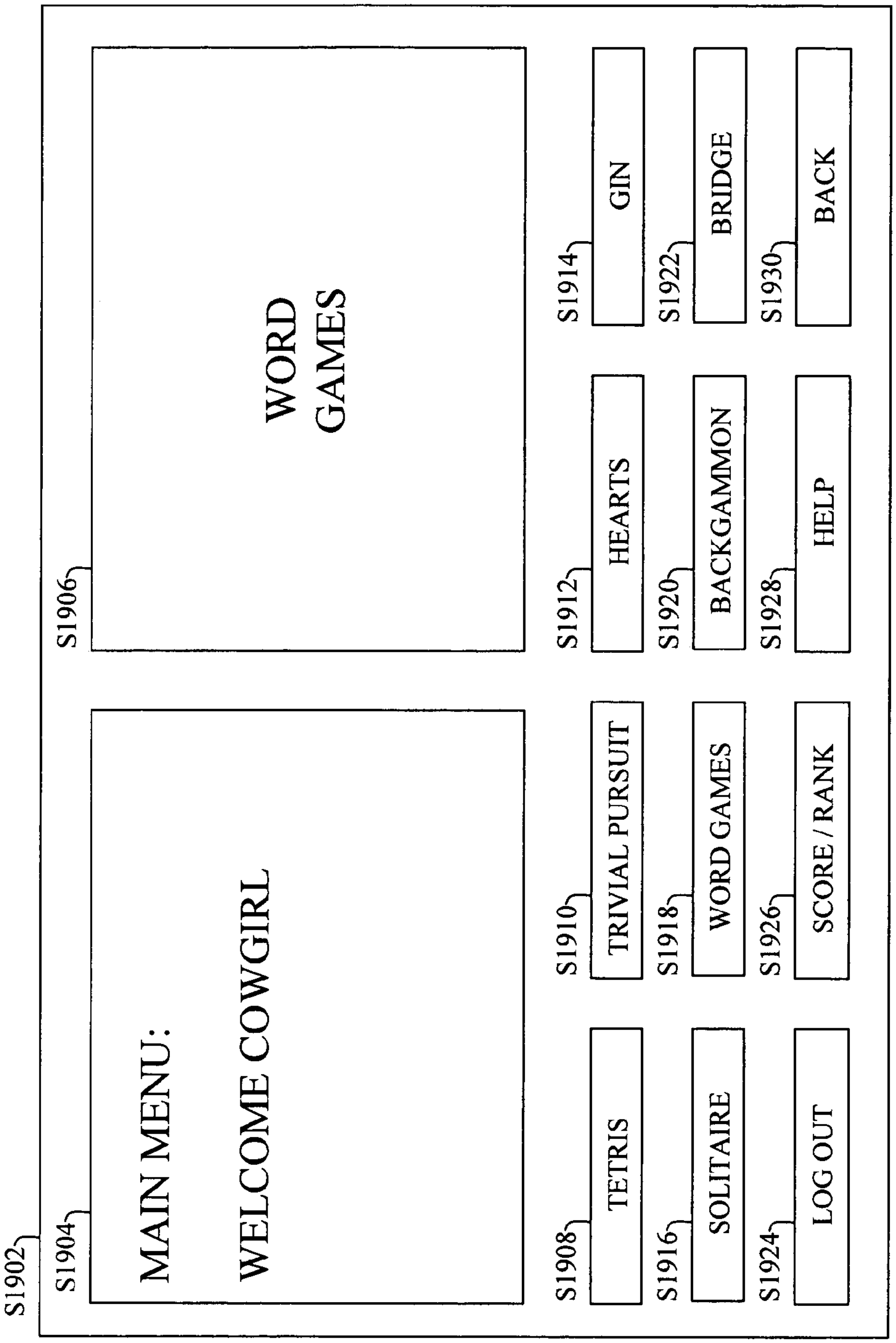
FIG. 19 shows an example main menu displayed to a user in accordance with an embodiment of the present invention.

The network communication unit 114 receives the user received signal 112 and outputs a user display signal 116 to a user output unit 118. FIG. 19 shows an example Main Menu as could be displayed to a user on the user output unit 118. The network communication unit 114 receives signals from a downstream portion of a network connection 120, denoted as a network downstream signal 122, attached to a communication network 126. The downstream signal 122 can be a cable TV signal, a cable data signal, a Digital Subscriber Line (DSL) modem downstream signal, a satellite downlink carrying either TV or data signals, a wireless receiver, or a telephone data connection such as with a dial-up modem. The network downstream signal can be received from a cable TV network interface, a cable modem, a digital subscriber line modem, and a satellite modem connection, for example.

The network communication unit 114 outputs signals to an upstream portion of the network connection 120, denoted as a network upstream signal 124, attached to the communication network 126. The upstream signal 124 can be a cable TV signal, a cable data signal, a DSL upstream signal, telephone connection either a data connection such as through a dial-up modem or a voice response system, or a wireless transmitter, for example. The communication network 126 is a flexible interconnection of communication resources and can include communication over the internet using the Transmission Control Protocol/Internet Protocol (TCP/IP), a wide area network (WAN), a local area network (LAN), a bidirectional cable network, a satellite downlink, and a telephone system allowing the interconnection of multiple network devices to facilitate communication between the network devices over the communication network 126.

Due to the flexibility of multiple connection paths, the interactive gaming network is robust and can be flexibly reconfigured to route around impediments in segments of the network. For example, if the user 102 typically accesses the communication network 126 through an upstream channel using a telephone dial-up data connection and a downstream channel using the cable TV network connection, a temporary outage in the cable TV downstream may be replaced by substituting the DSL downstream channel or the Satellite TV downlink channel, for example. This substitution may be done transparently without notifying the user or substantially interfering with game play, depending on the system configuration, user preferences, and any pre-existing subscription parameters. Thus, the gaming terminal 108 communicates bi-directionally with the communication network 126 through the network connection 120, and can respond to various network difficulties by routing around the affected segments. The cable TV network connection includes applying the upstream signal to a cable TV network interface such as a Network Interface Device (NID), the upstream channel of a cable or DSL modem, or a dial-up modem.

Figure 2:
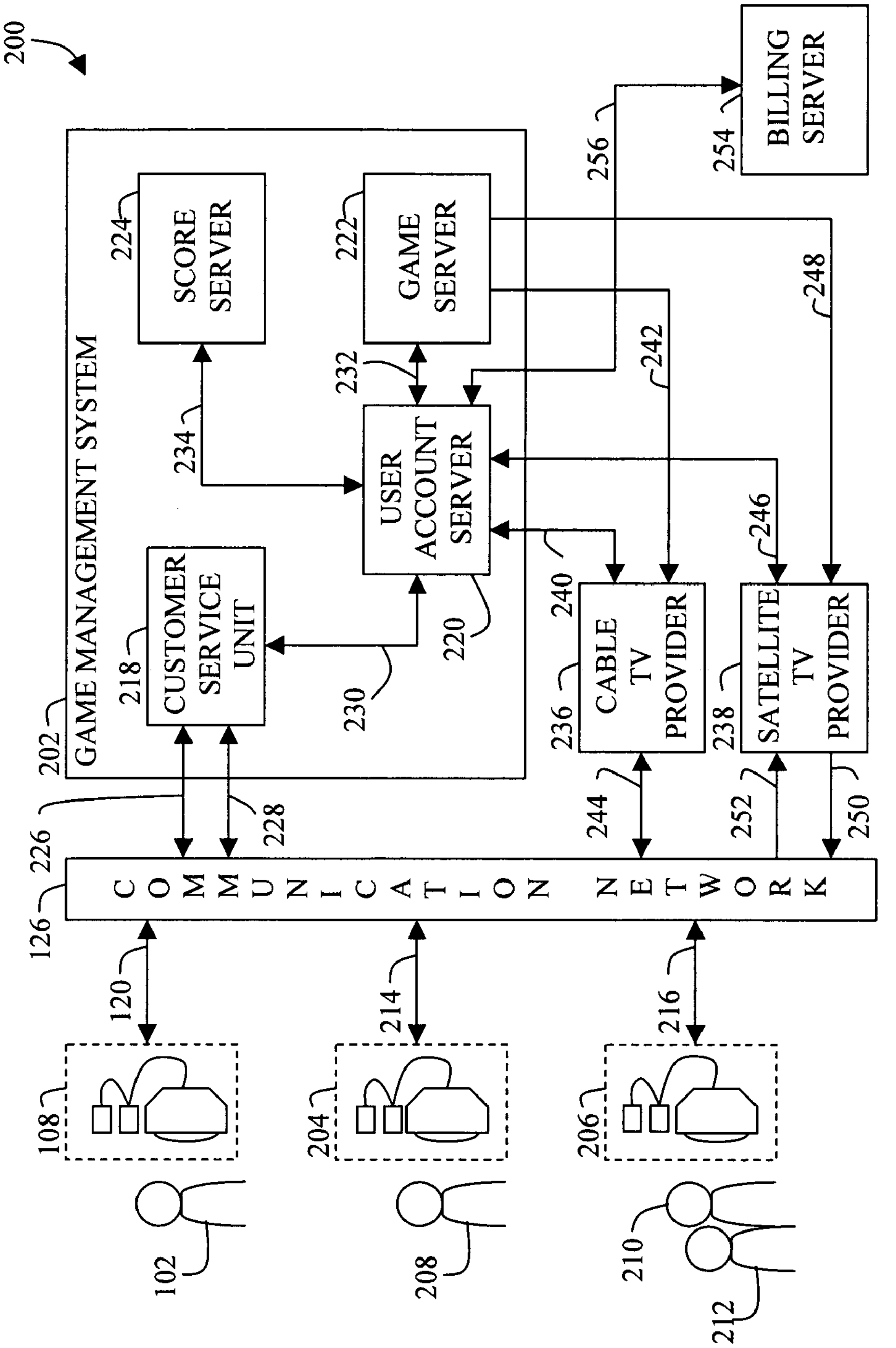
FIG. 2 is a diagram showing the interactive gaming system including a plurality of gaming terminals, a game management system, a cable TV provider, and a Satellite TV provider in accordance with an embodiment of the present invention.

In reference to FIG. 2, an interactive gaming system 200 includes a game management system 202, the communication network 126, and a plurality of gaming terminals (108, 204, 206). The game management system 202 is connected to the plurality of gaming terminals through the communication network 126. Each of the plurality of gaming terminals (108, 204, 206) connects to the communication network 126 through a network connection (120, 214, 216). The network connections are similar, but are flexibly reconfigurable as discussed above. One or more users (102, 208, 210, 212) operate each gaming terminal.

Although only three gaming terminals (108, 204, 206) are shown, the interactive gaming system can include millions of users at millions of gaming terminals. Gaming terminals may be located in a residence, a hotel room, a casino, a tournament center, and a retail gaming establishment providing access to the interactive gaming network, for example. For the purposes of this disclosure, a user is a person who operates a gaming terminal and may alternatively be referred to as a player and vice versa.

The game management system 202 includes a customer service unit 218, a user account server 220, a game server 222, and a score server 224. A user 102 at the gaming terminal 108 can access the game management system 202 through the communication network 126. The gaming terminal 108 is connected to the communication network 126 through the bi-directional network connection 120. A user 102 accesses the game management system 202 through the gaming terminal 108 by using the user input unit 104 to log in and begin an active session on the interactive gaming network 200.

The user 102 can access the customer service unit 218 through an internet connection 226 or a telephone connection 228 from the communication network 126 to the game management system 202. The customer service unit 218 includes both a customer access server and a customer call center. The customer access server allows the user 102 to either manually or automatically enter their unique account identifier and gain access to their subscriber account information in the user account server 220. The user can manually enter their unique account identifier by entering information in a web-based browser displayed on the user output unit 118 by the user 102 manipulating the user input unit 104 for access over the internet connection 226, or by pressing a predetermined sequence of numbers on a touch-tone telephone for access over the telephone connection 228 in an automated voice response system. FIG. 19 shows an example of a main menu presented to an example player named "COWGIRL" along with various options. Alternatively, the user 102 can initiate access to the game management system 202 through talking with call center personnel. The call center personnel can also assist the user in updating account profile information, changing or confirming payment options, and resolving account or network problems, for example.

The user account server 220 is connected to the customer service unit 218 through a bi-directional channel 230 for sending, receiving, and updating customer account information. The call center can include an automated voice-response system through which the user 102 can access their account information and initiate access to the game management system 202 by speaking or pressing buttons on a touch-tone phone as described above.

The user account server 220 is connected to the game server 222 through a bi-directional connection 232 for sending and receiving information related to available and selected games. The user account server is connected to the score server through a bi-directional connection 234 for sending and receiving score information. The game server 222 provides a plurality of games to the users of the interactive gaming system 200, while the score sever 224 receives, processes, and outputs the scores from the plurality of users playing a plurality of selected games as will be discussed below.

The interactive gaming system 200 can include a cable TV provider 236 for providing cable TV programming to a plurality of users through the communication network 126. The cable TV provider 236 communicates with the user account server 220 through a bi-directional connection 240 for sending and receiving user account, game events, and transaction information. The cable TV provider 236 communicates with the game server 222 through a uni-directional connection 242 for receiving packaged game information from the game server 222.

The packaged game information includes both advertising information for various games, as well as providing the games for downloading by the user into the user's gaming terminal 108. The cable TV provider 236 is connected to the communication network 126 through a bi-directional connection 244. The user can access the user account server 220 by generating an upstream signal 124 through the communication network 126, through the bi-directional connection 244, to the cable TV provider receiver to the user account server 220. Conversely, cable TV signals can be provided through the bi-directional connection 244, through the communication network 126, through the network connection 120 downstream signal 122, and to the user's gaming terminal 108.

Similarly, the interactive gaming system 200 can include a satellite TV provider 238 for providing satellite TV programming to a plurality of users through the communication network 126. The satellite TV provider 238 communicates with the user account server 220 through a bi-directional connection 246 for sending and receiving user account, game events, and transaction information. The satellite TV provider 238 communicates with the game server 222 through a uni-directional connection 248 for receiving packaged game information from the game server 222.

The satellite TV provider 238 is connected to the communication network 126 through a uni-directional connection 250 forming a portion of the satellite downlink as a downstream connection and through a uni-directional connection 252 forming a portion of the telephone system as a back-channel upstream connection. The user 102 can access the user account server 220 by generating an upstream signal 124 through the communication network 126, through the uni-directional connection 252, through the satellite TV provider 238 back-channel receiver, and to the user account server 220. Although the user 102 is used for illustration, this discussion may be applied to any user of the interactive gaming system 200.

The user account server 220 communicates with a billing server 254 over a bi-directional connection 256 for sending and receiving information, and can include information relating to electronic commerce, subscriber authentication, reconciliation and settlement the user's accounts, as well as servicing accounts with a third-party such as the cable TV provider 236 or the satellite TV provider 238, for example.

Figure 3:
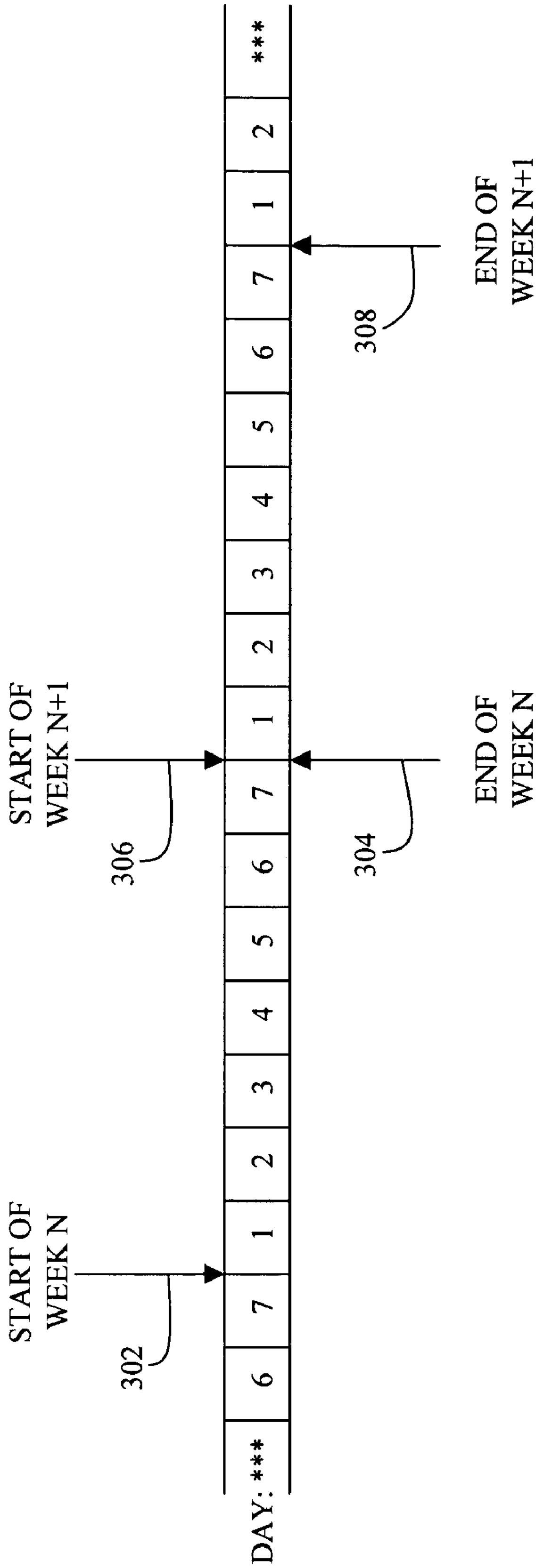
FIG. 3 shows examples of the weekly competition periods in accordance with an embodiment of the present invention.

In reference to FIG. 3, in one embodiment, the plurality of users play a plurality of games over a predetermined competition period. This competition period is preferably one week in duration. For example, the Nth competition period begins at the start of week N 302. The Nth competition period ends seven days later at the end of week N 304 which also begins the start of week N+1 306. The N+1th week ends at the end of week N+1 308. Although FIG. 3 shows the competition period starting on day 1, the competition period may start on any day of the week, and simply persists until the same time on the following week.

The competition period can be preferably from the beginning of Sunday to the end of Saturday, for example. In another embodiment, the competition period can be from the beginning of Wednesday to the end of Tuesday. Although the competition period is preferably one week (seven days) long, another period may be used. For example, the competition period can be for a consecutive two week period starting on any day of the week. Alternatively, the competition period can be for one month beginning on the first day of the month and ending on the last day of the month, for example.

Figure 4:
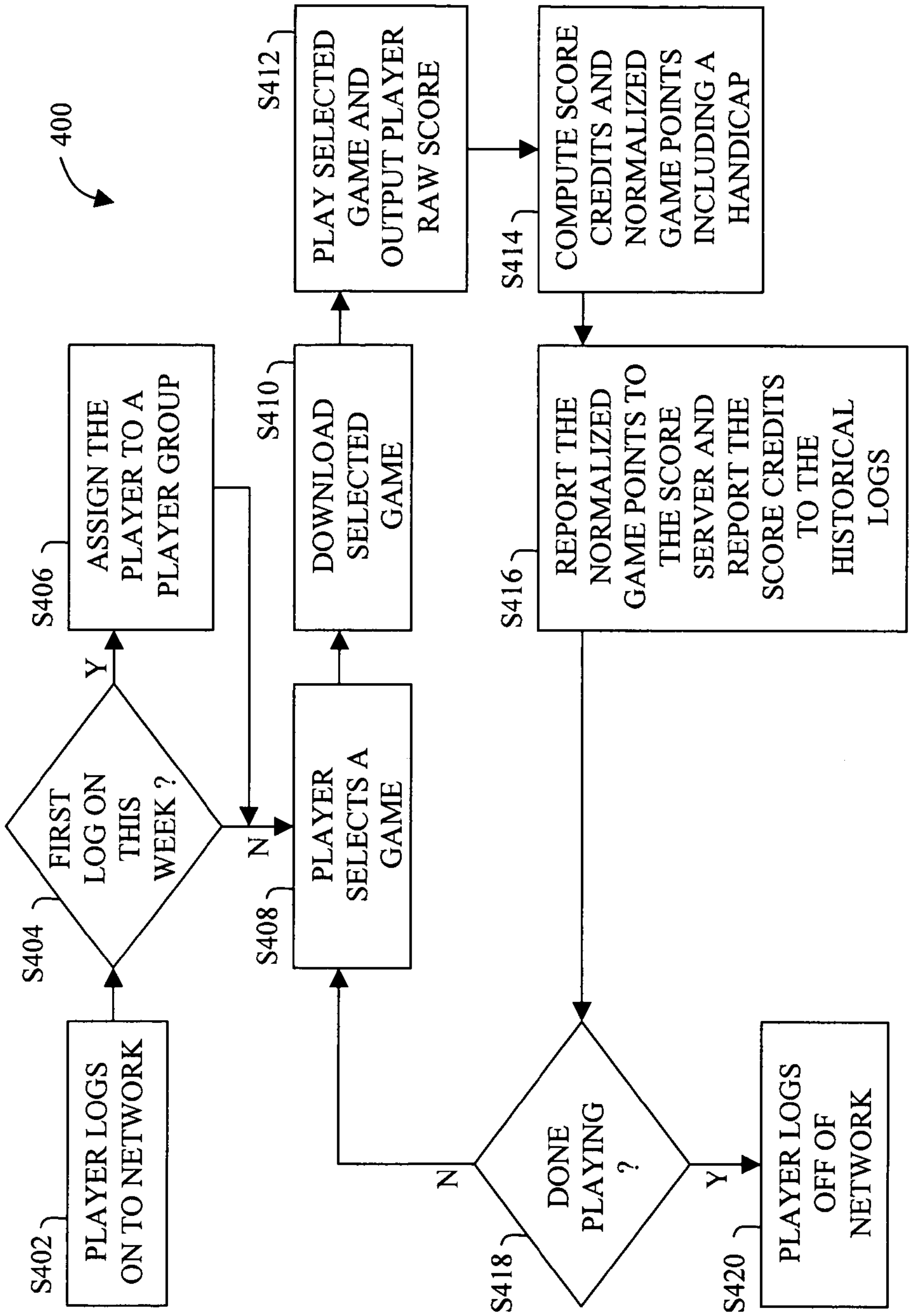
FIG. 4 shows a flow diagram of a playing session in accordance with an embodiment of the present invention.

In reference to FIGS. 1 and 4, a playing session 400 is shown and described. The steps, including decisions and computations, described herein can be accomplished using one or more suitably programmed and interconnected computer-based systems. In step S402, a user 102 logs onto the game network using the gaming terminal 108 by submitting a unique user identification code corresponding to a user account. In step S404, the gaming terminal 108 determines whether this is the first log on for the user during the current competition period. If it is the first log on by this user 102 for the current competition week, control passes to step S406 where the user 102 is assigned to be a member of a currently filling player group.

Figure 8:
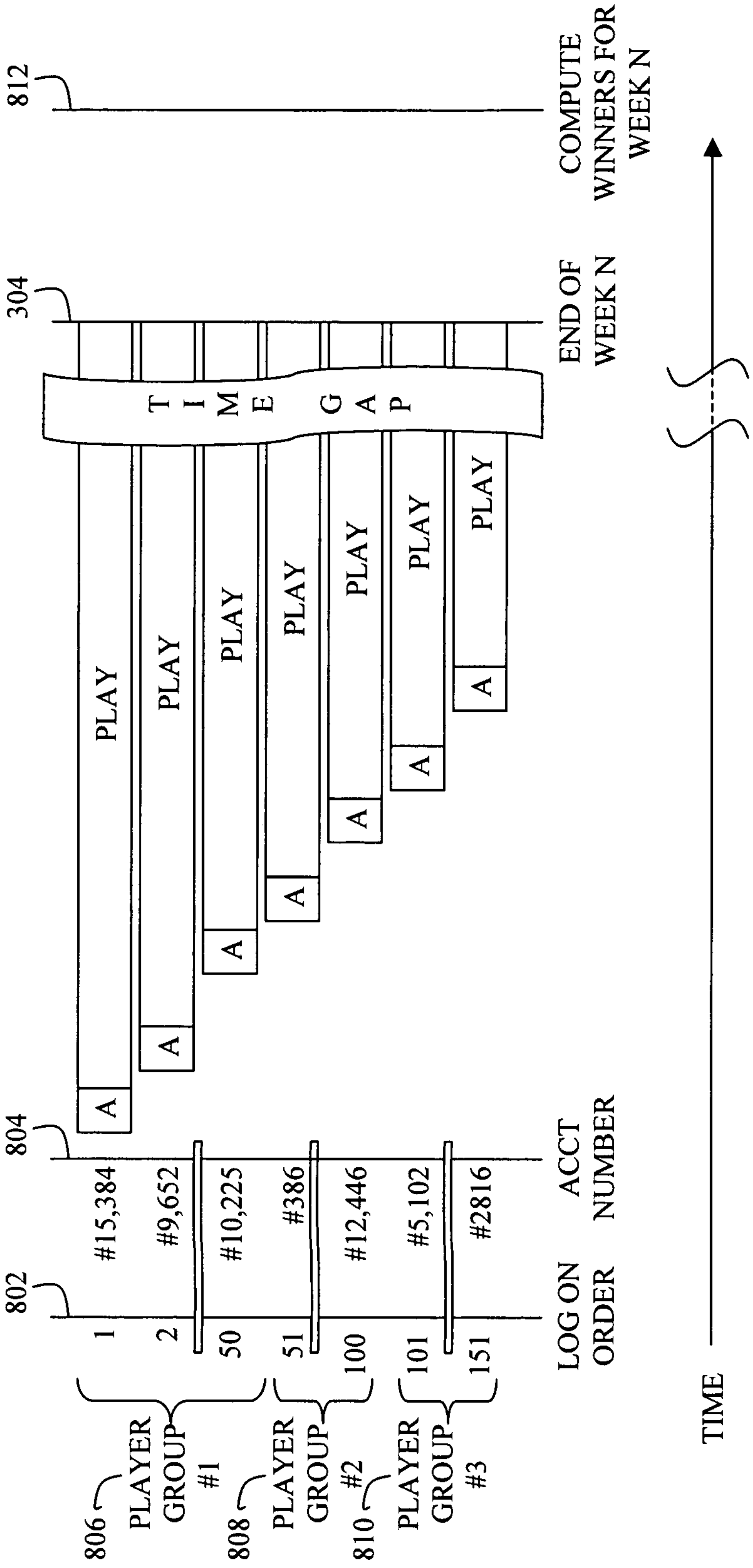
FIG. 8 illustrates an example assignment of players to player groups in accordance with an embodiment of the present invention.

FIG. 8 illustrates an example assignment of users to player groups based on their order of logging onto the gaming network. After step S406, or if this is not the first log on to the game network this week, the player is already a member of a player group, and control passes to step S408. Each player is assigned to a player group based on the order in which they first log on to the gaming network, or alternatively when the user selects their first game of the current competition period, effectively beginning the competition period.

The player groups contain a maximum number of fifty users, and each member of the player group is compared against the other members of their player group to determine a winner. Thus, it appears to the user be a random assignment to a player group, but actually it is a sequential assignment. The goal of this assignment process is to ensure a particular user 102 is not necessarily assigned to the same player group, or with the same player group members as in the previous week. Thus, a user is assigned to a player group containing a seemingly random association of other users allowing an opportunity to compete against a different group of people every week. Players are assigned to the currently filling player group until a maximum number of users are assigned, preferably fifty users. Once the current player group is filled, the player group number is advanced, and newly logged on users will be assigned to the new player group number until a maximum of fifty users are assigned, and so on.

Figure 5:
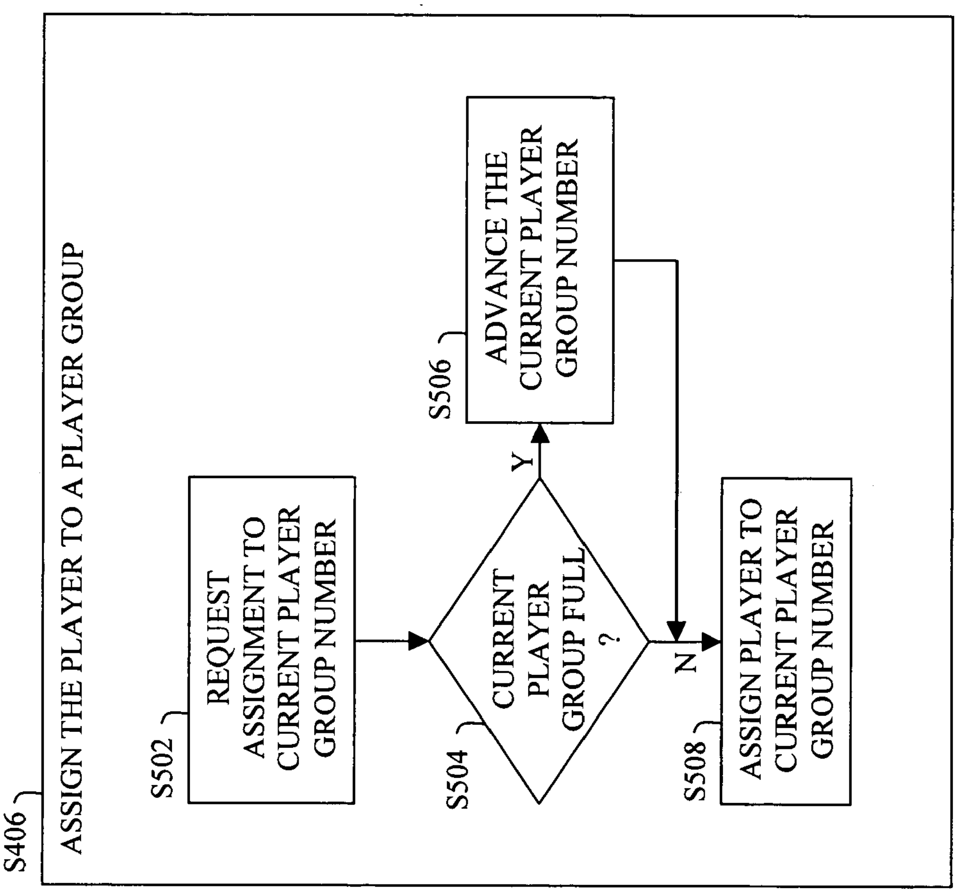
FIG. 5 shows a flow diagram of FIG. 4 step S406 to assign the player to a player group in accordance with an embodiment of the present invention.

In reference to FIG. 5, step S406 is explained in greater detail. In order to assign a player to a player group, a request is issued in step S502 from the gaming terminal 108 to the score server 224 requesting assignment of the player with a unique user identifier to the currently filling player group number and control passes to step S504. In step S504, the current player group number is examined to determine if the player group is full. That is, if maximum number of assigned players in the player group has been reached. If the player group is full, control passes to step S506 where the current player group number is advanced to a new player group number and control passes to step S508. Typically the player group number is incremented to the next available group number. In step S504, if the current player group is not full, the player group number is not advanced and control passes to step S508 where the player is assigned to the current player group number and control passes to step S408.

An example of assignment of users to a player groups is shown in FIG. 8 with the symbol "A" indicating the assignment phase. The users log on to the interactive gaming system 200 in a particular log on order 802 and each user has a unique account number 804. In this example, a user with an account #15,384 logs onto the gaming network first at the beginning of a new weekly competition period and is assigned as the first player of player group #1 806. The assignment to a player group is nearly instantaneous. Similarly, the user with account #9,652 logs in second and is assigned to the player group #1 806.

This process continues until fifty users, in this case the user with the account #10,225 logs onto the gaming system and is assigned as the last member of the player group #1 806. Once the player group #1 806 contains fifty players, the player group #1 806 is considered to be full. When the user with account number #386 logs in as the 51st player, they are assigned as the first member of the player group #2 808. Similarly, the user #12,446 logs in as the 100th player and is assigned as the last member of the player group #2 808. Once the player group #2 808 has a total of fifty players, the player group #2 808 is full, and the player group number is advanced to indicate a new player group. Although the player group numbers are shown as incrementing numbers they can be represented with other indicia as long as the player group identifiers are unique.

In step S408 as shown in FIG. 4, once a player is logged in and has been assigned to a player group, the player selects a game from a plurality of different games and control moves to step S410. In step S410, the selected game is downloaded from the game server 222 onto the gaming terminal 108 and control moves to step S412. The selected game is typically less than about 500 kilobytes (KB) in size, and does not require a substantial downloading time.

In step S412, once the selected game is downloaded to the gaming terminal, the player can then play the selected game. The selected game is played locally on the gaming terminal 108, and is typically composed of a set of computer instructions executing on a computer system within the network communication unit 114. The network communication unit 114 can be a Set Top Box (STB) configured for cable television (CATV), for example. Once the game is ended a present raw score value is produced which is an indication of the performance of the player during the game. The present raw score value is distinguished from past raw score values for the selected game. Once the selected game is ended and the present raw score value produced, control moves to step S414.

In step S414, a ranked percentage score value is calculated which is a non-game-specific measure of the player's performance during the game. The ranked percentage score value is determined in comparison to a predetermined reference score value which can be a theoretical high score value, an actual high score value over a predetermined period of time, or can be determined from a history of past raw score values for the selected game as will be described below. In reference to FIG. 6, the computation of the normalized game points is explained in greater detail. In step S602, a list of historical raw score values for the selected game is retrieved from the score server 224.

Figure 11:
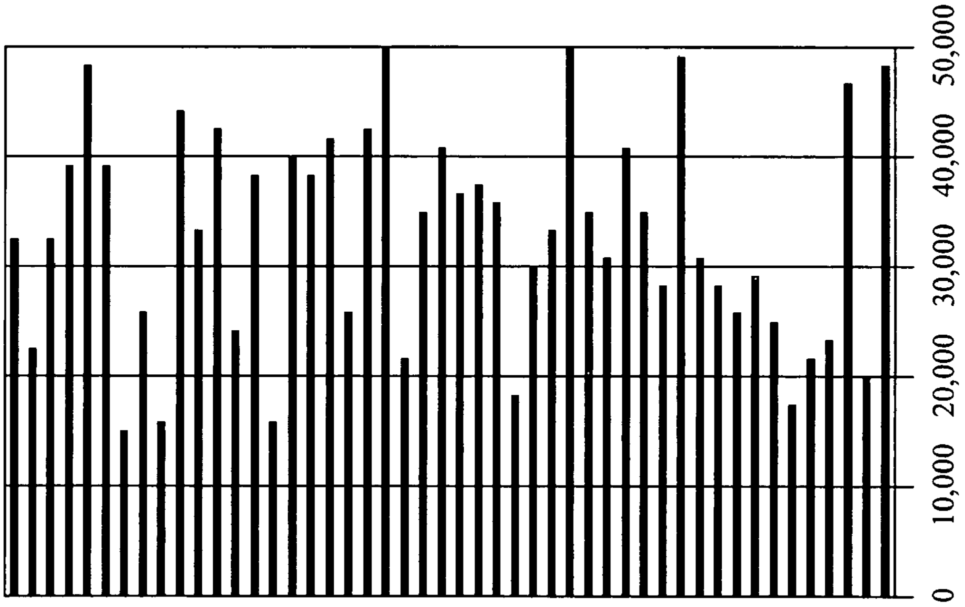
FIG. 11 shows a history of raw score values for a representative game in accordance with an embodiment of the present invention.

FIG. 11 shows a history of raw score values for a representative game. These historical raw score values range from a low of about 15,000 points to a high of 50,000 points and include all the raw score values for all players of the selected game over a predetermined historical period. The predetermined historical period is preferably the previous four weeks, but can alternatively be a longer or a shorter period. Once the historical raw scores are retrieved, control passes to step S604.

Figure 12:
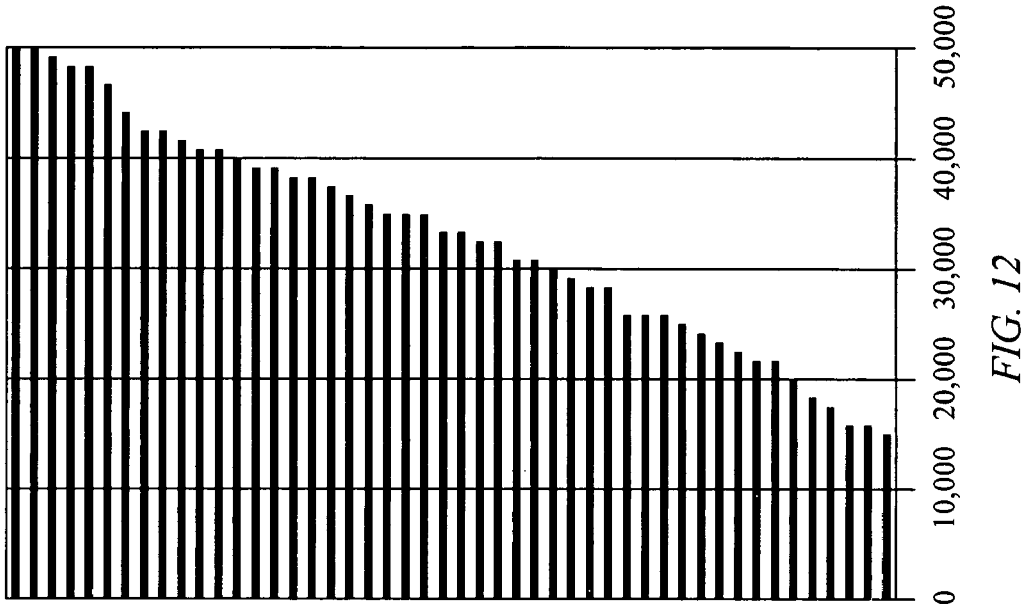
FIG. 12 shows the history of raw score values for the representative game as they are ranked from low to high in accordance with an embodiment of the present invention.
Figure 14:
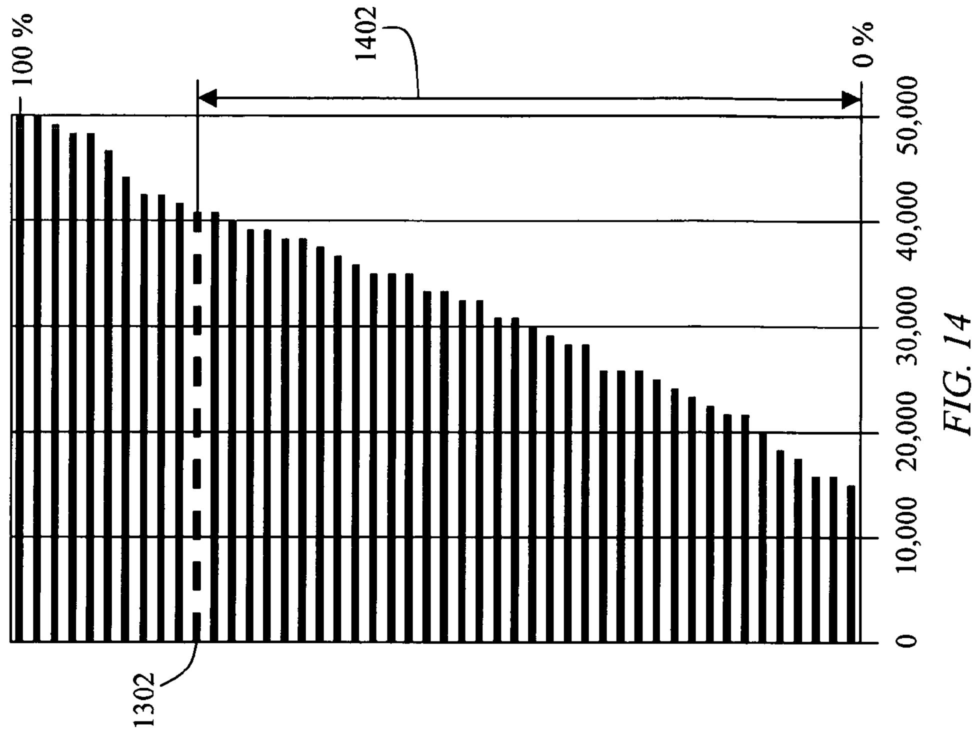
FIG. 14 shows a present ranked percentage score value in accordance with an embodiment of the present invention.
Figure 13:
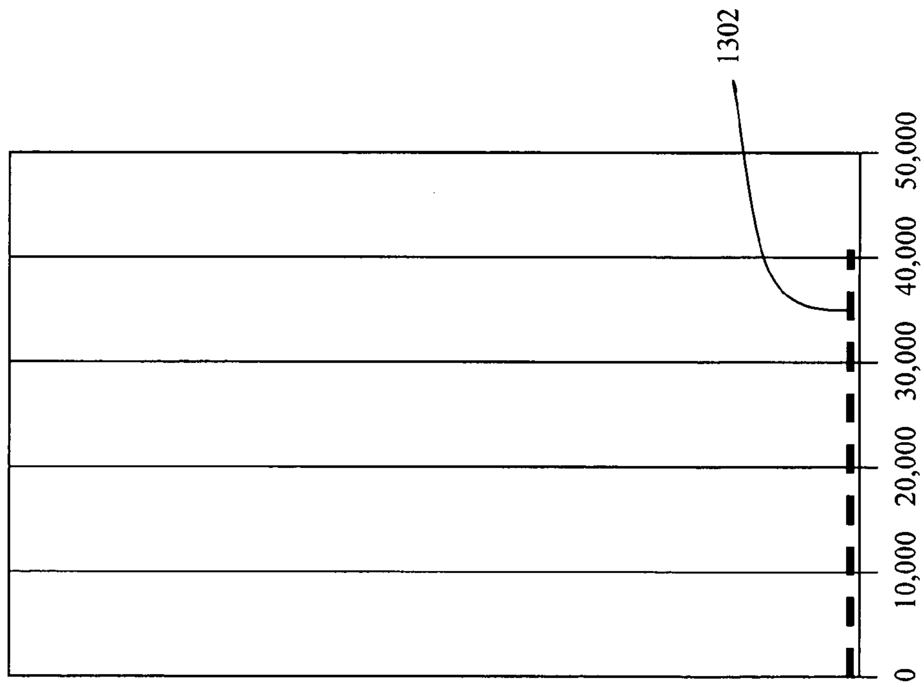
FIG. 13 shows an example present raw score value in accordance with an embodiment of the present invention.

In step S604, the historical raw score values are ranked from low to high as shown in FIG. 12 and control passes to step S606. An example present raw score value 1302 is shown in FIG. 13. In step S606, the present raw score value 1302 is compared with the ranked historical raw score values in order to determine a better-than percentage score credit. FIG. 14 shows a present ranked percentage score value 1402 which is the percentage of past raw score values below the present raw score value. A ranked percentage score value can alternatively be referred to as a score credit.

The score credit is a measure of the relative performance of the player of the selected game compared with a history of other player's scores. Since the score credit compares a player's performance against a history of performance to determine a relative ranking, the result is a normalized score value that may be compared relative to other games with different scoring methods. It is fair to compare score credits from different games since each score credit value is computed in reference to all players of the specific game over a period of time.

For example, a user of the gaming system, Player A, plays a first game such as a falling-blocks game similar to TETRIS (®) where the player's goal is to construct a completed row of blocks in a limited time. Player A receives a score credit based on his performance as measured against the historical performance of previous players of the first game as discussed above.

Another user of the gaming system, Player B, plays a second game such as a trivia game similar to TRIVIAL PURSUIT(®) where the player's goal is to answer a series of questions in a limited time with the player gaining more points for answering the question more quickly. Player B receives a ranked percentage score value based on his performance as measured against the historical performance of previous players of the second game as discussed above.

Since both Player A and Player B receive a ranked percentage score value for their performance, it is possible to compare the results between Player A and Player B to determine a winner, even though they have played different games. The winner in this case is the player who performed better against the history of players of their chosen game. Thus, the ranked percentage score value, or score credits, can be considered a non-game-specific score value. The non-game-specific score value from a player playing a first game may be compared with the non-game-specific score value from a player playing a second game since the non-game-specific score values are determined based on an objective standard.

The objective standard can include all or a portion of a history of previous raw score values from the selected game, a game-specific target score value for the selected game as determined by a gaming system manager, an actual all-time highest score value for the selected game, or a default value determined by the gaming system manager for use in some cases such as before a sufficient history has been accumulated to account for the case when a new game is introduced to the network, for example. When using the game-specific target score value or the all-time highest raw score value as the maximum score value, all other score values are normalized as a percentage based on the maximum score value. In this case, the non-game-specific score value is the ratio of the player raw score value to the target game-specific target score value expressed as a percentage. The game-specific target score value need not be attainable, but may represent what is deemed to be an impossible score value. In any case, the normalized score credits value will not exceed 100%.

Figure 6:
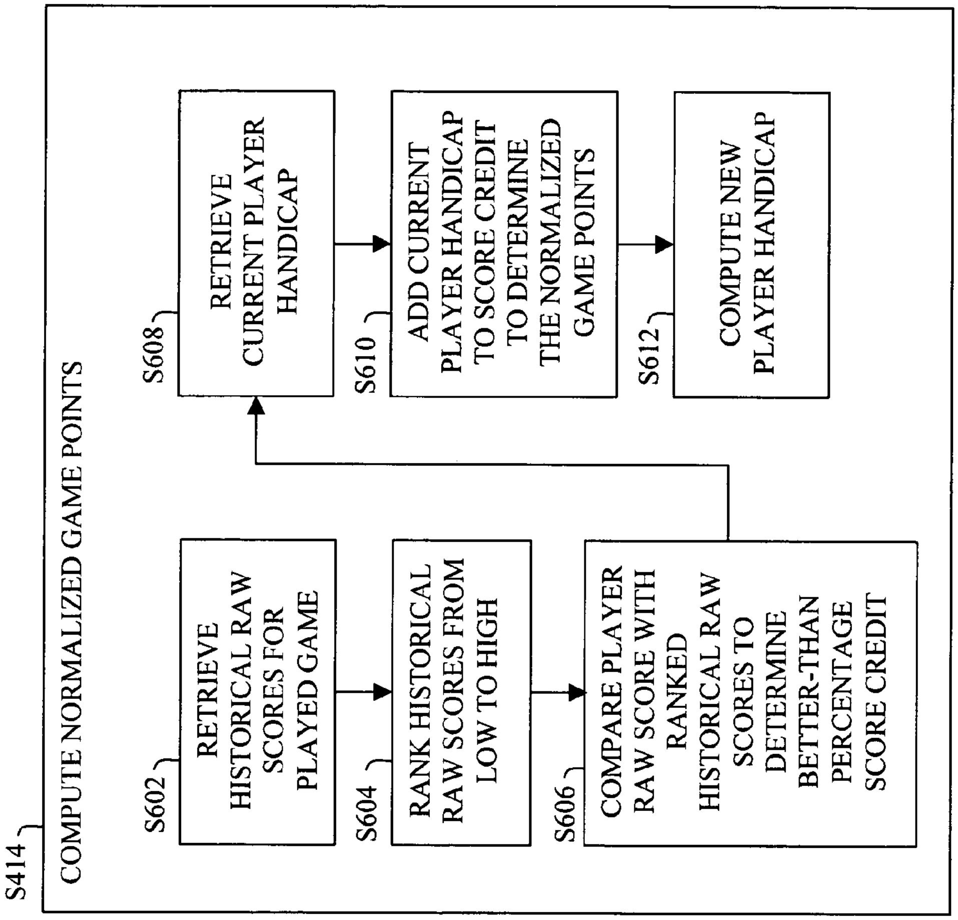
FIG. 6 shows a flow diagram of FIG. 4 step S414 to compute the normalized game points in accordance with an embodiment of the present invention.

In another embodiment, an average of the score credits gained by a particular player are compared with averages of other players. In this case, a minimum number of games must be played in order to have a qualifying average. The minimum number of games played is preferably five, but another value such as ten or twenty could also be used. In another embodiment, a handicap value is added to the score credits value to make it possible for players of differing abilities to enjoy fair competition. As shown in FIG. 6, once the score credit value is determined in step S606, control moves to step S608 where the current player handicap is retrieved. After the current player handicap value is retrieved, control moves to step S610. The current player handicap value is determined based on the selected game, and is not typically transferable to a different game.

In step S610, the current handicap value is added to the present ranked percentage score value (or present score credits) to determine a normalized game points value and control moves to step S612. If the present score credit is 72.500 and the current player handicap value is 21.420, the normalized game points are 72.500+21.420=93.920. In step S612, a new player handicap is calculated using the present score credits value. Thus, the player handicap value is adaptively changed or updated based on the present score credits value after every game. Alternatively, the new player handicap may be computed prior to determining the normalized game points and can include the present ranked percentage score value for the immediately preceding game. In any case, the normalized game points value will not exceed 100%.

Once the normalized game points are computed, control moves from step S414 to step S416 where the normalized game points are reported to the score server 224 and both the raw scores and the score credits are stored in a historical log. Alternatively, the normalized game points can be reported at a later time, including an extended time after the user has logged off the interactive gaming system 200. A historical log is separately kept for all raw scores for each selected game in order to provide a basis upon which to judge a new score for that selected game and produce a score credit. A historical log is also kept of the previous score credits of a particular player for each type of game played in order to produce a handicap value for that same game as will be discussed below.

Figure 7:
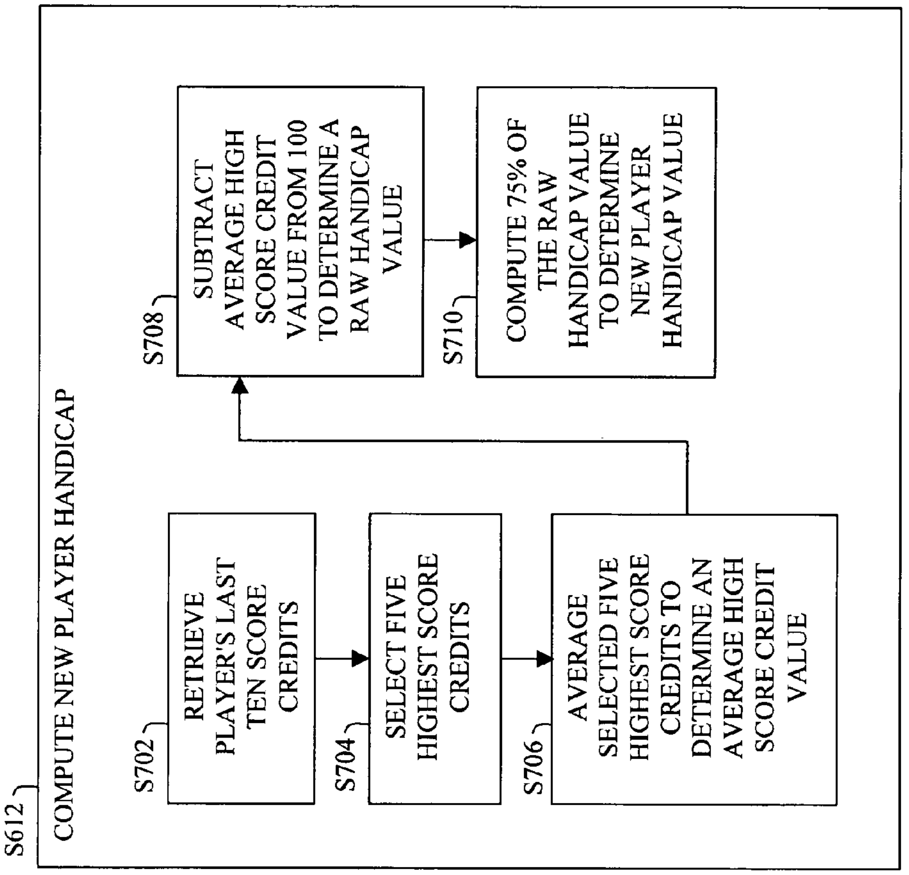
FIG. 7 shows a flow diagram of FIG. 6 step S612 to compute a new player handicap in accordance with an embodiment of the present invention.

The handicap value itself can be calculated in one of several ways. As shown in FIG. 7, in the preferred embodiment, the handicap value is calculated by retrieving the player's last ten raw score credit values for the selected game, examining the last ten score credit values to determine the five highest score credits, averaging these highest five score credit values to determine an average high score credit value, subtracting the average high score credit value from the maximum possible ranked percentage score (100%) to determine a raw handicap value, and computing a known percentage of that raw handicap value to serve as the new handicap value to be added to new score credit value and determine the normalized game points value. Thus, the player's handicap value is adaptable based on an average of the most recent high scores produced by the player.

Figure 15:
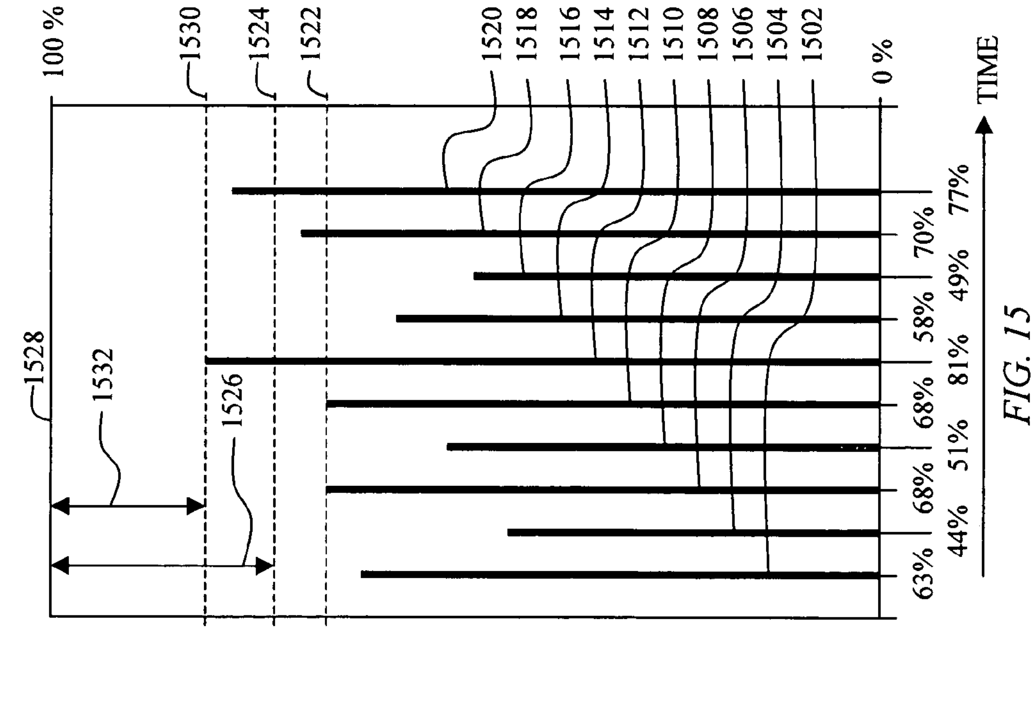
FIG. 15 shows an example of the last ten score credit values and the calculation of a handicap value in accordance with an embodiment of the present invention.

In reference to FIG. 15, an example of the last ten score credit values are shown (1502, 1504, 1506, 1508, 1510, 1512, 1514, 1516, 1518, 1520) along with the corresponding ranked percentage of each score credit at the lower portion of the diagram. The score credit value 1502 is oldest in time while the score credit 1520 is newest in time. The five highest score credits (1506, 1510, 1512, 1518, 1520) extend vertically in the diagram touching or crossing the limit line 1522. The five highest score credits are 68%, 68%, 81%, 70% and 77%, respectively. An average of the five highest score credits is shown in the limit line 1524 and is equal to (68%+68%+81%+70%+77%)/5=(364/5)%=72.8%. The raw handicap value in this embodiment is the difference 1526 between the limit line 1524 and the 100% line 1528. The difference 1526 is 100%−72.800%=27.200%.

The raw handicap value is multiplied with a scaling factor to determine a new player handicap value. The scaling factor is preferably 95%, so the raw handicap value is multiplied by 19/20. For example, if the average of the highest five of the previous ten score credits is calculated to be 72.800%, the raw handicap value is determined to be 100%−72.800%=27.200% and the new player handicap is calculated to be (27.200%)*(19/20)=25.840%. Alternatively, a scaling factor of either 75%, 80%, or 90% can be used and the raw handicap value is multiplied by (3/4), (4/5), or (9/10)

respectively to determine the actual handicap value. In another embodiment, the handicap value is determined by the single highest score for the selected game during the competition period, and all the previous score credit values are re-computed based on a newly determined handicap value. This alternative has the consequence of possibly lowering previous scores already recorded while rewarding consistent scoring. For example, using the handicapping described above, an aberrational high score would tend to lower a player's game points values by using the lowest handicap of the period. However, a player who consistently performs around the same level will have a reasonable handicap for their performance, and would effectively compete with other consistently scoring players.

Figure 18:
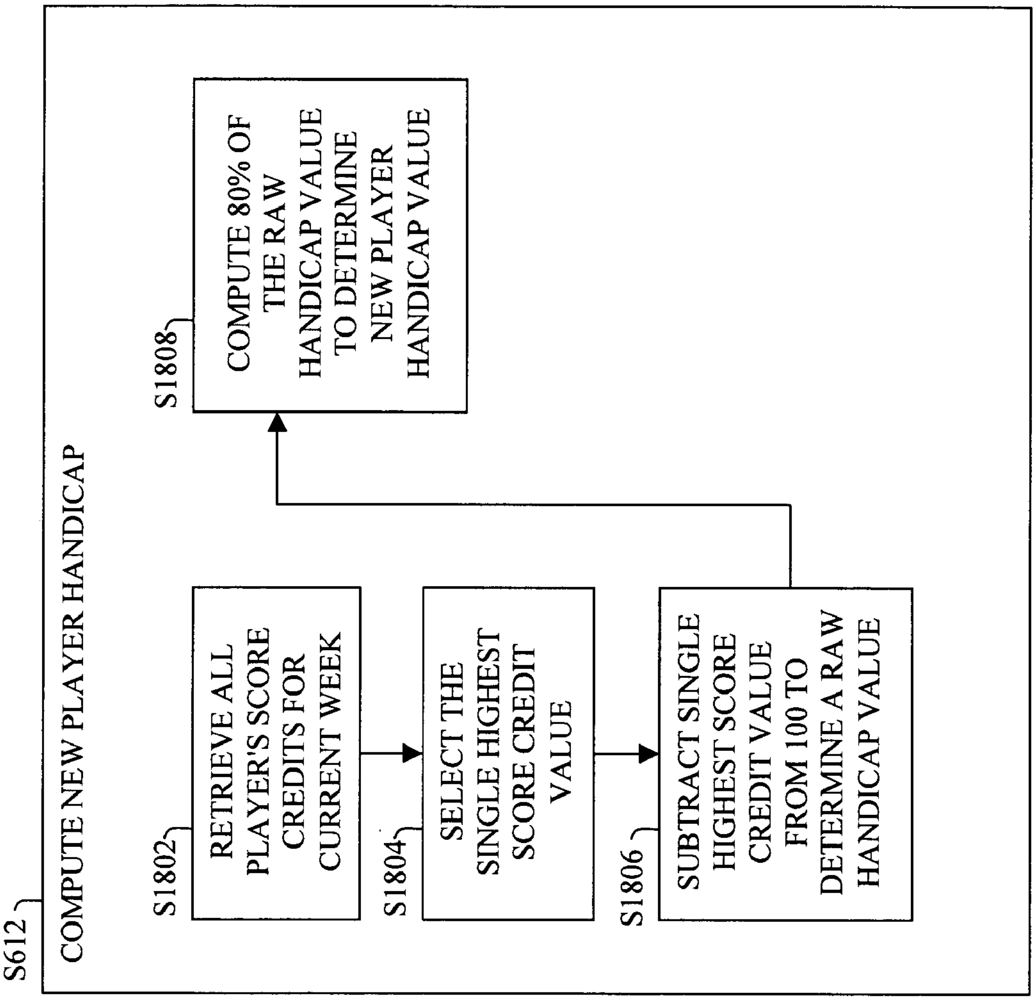
FIG. 18 shows a flow diagram of FIG. 6 step S612 to compute a new player handicap in accordance with an embodiment of the present invention.

In reference to FIG. 18, another embodiment wherein the handicap value is calculated based on the single highest score credit value, for example in FIG. 15, credit value 1512 of the previous score credits earned during the current competition period as shown by the limit line 1530. The raw handicap value 1532 is calculated as the difference between the limit line 1530 and 100% line 1528. In this case, the preferred scaling factor is 80%. FIG. 18 shows an alternative handicap calculation flow which substitutes for the step S608 and eliminates step S612 shown in FIG. 6.

In step S1802, all of the player's score credit values are retrieved for the current competition period, and control flow moves to step S1804. In step S1804, the single highest score credit value is selected from among the retrieved score credit values, and control flow moves to step S1806. In step S1806, the single highest score credit value for the current period is subtracted from 100% to determine a raw handicap value, and control flow moves to step S1808. In step S1808, 80% of the raw handicap value is computed to be the new handicap value, and control, flows moves to step S610 as shown in FIG. 6.

Figure 16:
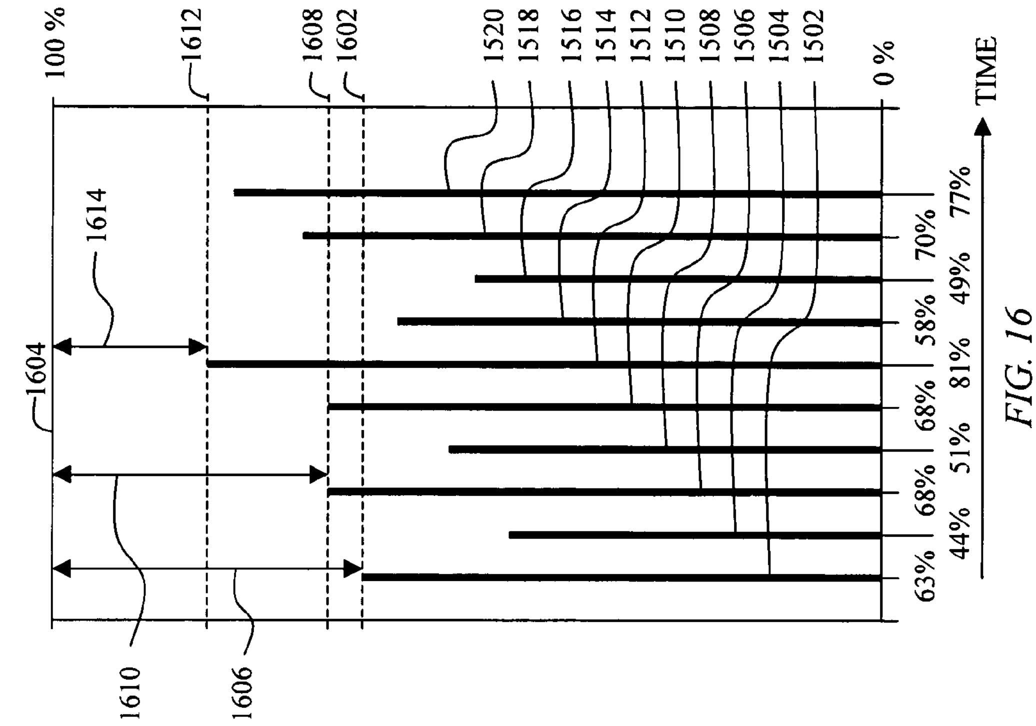
FIG. 16 shows an example of the last ten score credit values and the calculation of a handicap value in accordance with an embodiment of the present invention.

In reference to FIG. 16, the first score credit value 1502 is ranked at better than 63% of the historical score credit values earned for the selected game. Although the score credit value 1502 appears to show only two significant digits, the actual precision of the score credit representation can include at least six significant digits. However, the actual number of significant digits is not considered to be relevant when comparing individual or averaged score credit values. A handicap value is calculated starting from this first value.

Figure 17:
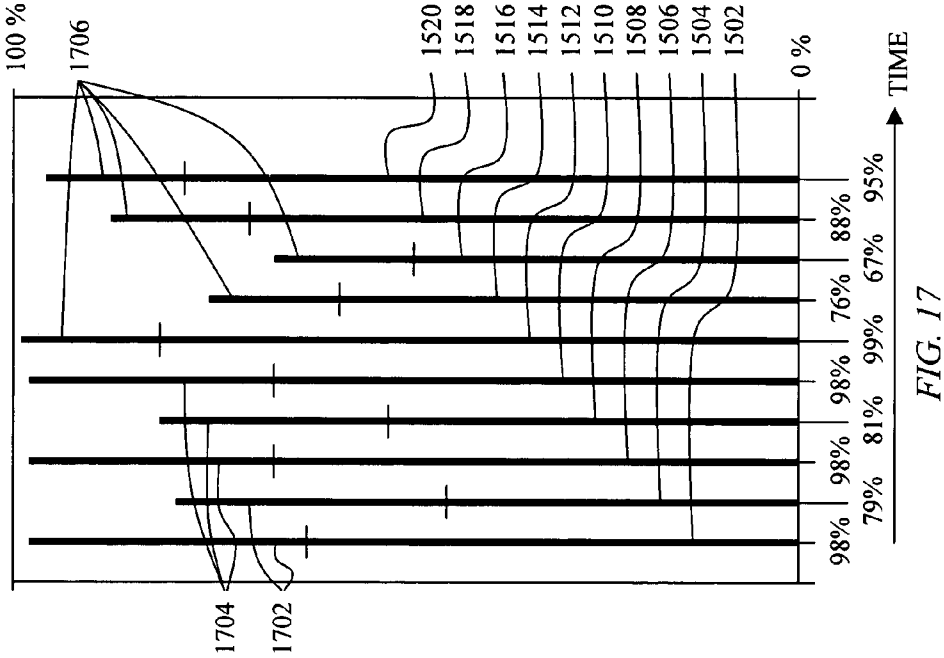
FIG. 17 shows an example of the normalized game credits after a handicap is added to each score credit value in accordance with an embodiment of the present invention.

For example the intra-week raw handicap value starts at 100%−63%=37% which is multiplied by a scaling factor such as (19/20) or 95% of the difference between the maximum possible score credit value and the actual score credit value to determine the actual handicap value 1702, as shown in FIG. 17. In equation form, this may be expressed as (100%−63%)*(19/20)=35.150%. The normalized game points for the first game of the week would then be recorded as 63%+35.150%=98.150%, as shown in FIG. 17. This game points value is not changed once it is earned. The handicap value is adaptable based on following score credit values, but the previously earned game points values are not retroactively changed. For example, if a new handicap is subsequently earned, the previous game points values are not re-calculated.

After score credit 1502 is earned, the player selects another game and earns a score credits value 1504 which indicates that only 44% of the historical score credit values are below the current player's performance. In this embodiment, the handicap value is not recalculated since the subsequent score credit value 1504 is lower than the previous highest score credit value 1502 and the same handicap value is carried forward and used on the new game. The subsequent normalized game credit value associated with the score credit value 1504 uses the current or generic handicap value of 35.150% shown by 1702, so the normalized game credit value is 44% +35.150%=79.150%.

After score credit 1504 is earned and handicap 1702 appended, the player selects another game and earns a score credits value 1506 which indicates that 68% of the historical score credit values are below the current player's performance. This is a new high score credit value for this competition period, so a new generic handicap value 1704 is computed. The new handicap value 1704 is determined to be (100%-68%)*(19/20)=30.400%. The subsequent normalized game credit value associated with the score credit value 1506 uses the new handicap value of 30.400% shown by 1704, so the normalized game credit value is 68%+30.400%=98.400%. Similarly, the current handicap value 1704 is appended to score credit values 1508 and 1510 until anew, highest score credit value 1512 is earned.

After score credit 1510 is earned and handicap 1704 appended, the player selects another game and earns a score credits value 1512 which indicates that 81% of the historical score credit values are below the current player's performance. This is a new high score credit value for this competition period, so a new generic handicap value 1706 is computed. The new handicap value 1706 is determined to be (100%-81%)*(19/20)=18.050%. The subsequent normalized game credit value associated with the score credit Value 1512 uses the new handicap value of 18.050% shown by 1706, so the normalized game credit value is 81%+18.050%=99.050%. Similarly, the current handicap value 1706 is appended to score credit values 1514, 1516, 1518, and 1520.

According to an embodiment, if the player plays a predetermined minimum of games, such as five games of any type, the player is qualified to participate in the distribution of the winnings from one or more prize pools. In this case, the normalized game credit values earned by the player are averaged, and an average game credit value for each player is compared with the average game credit value for each of the other players within the player group as discussed above.

The game credits (GC) values for the example score credits (SC) and handicap (HC) values shown in FIGS. 16 and 17 are:

SC 1502+HC 1702=63%+35.150%=98.150%
SC 1504+HC 1702=44%+35.150%=79.150%
SC 1506+HC 1704=68%+30.400%=98.400%
SC 1508+HC 1704=51%+30.400%=81.400%
SC 1510+HC 1704=68%+30.400%=98.150%
SC 1512+HC 1706=81%+18.050%=99.050%
SC 1514+HC 1706=58%+18.050%=76.050%
SC 1516+HC 1706=49%+18.050%=67.050%
SC 1518+HC 1706=70%+18.050%=88.050%
SC 1520+HC 1706=77%+18.050%=95.050%

For an arithmetic average game credits value of (880.500%/10)=88.050% average game credits.

Since the player earned these game credits while playing at least five games during the competition period, this game credits score is qualified, and may be fairly compared with other players having a qualified game credits score, independent of the actual games played by each player. Similarly, the players having earned a games points average by playing a minimum number of games may be compared with the players of other player groups in order to determine a winner between the player groups.

In step S416 as shown in FIG. 4, the normalized game points are reported to the network and along with the score credits and raw score value are recorded in a historical log of all players for the selected game over a predetermined historical period. Typically, the historical period is four weeks with the historical log providing a history of normalized game scores with which to compare the present and future raw score values. The score credits value is also stored for use in computing a new handicap value as discussed above. Once the normalized game points and score credits are reported, control passes to step S418.

In step S418, the gaming terminal determines whether the user is done playing. If the user is done playing, control passes to step S420 where the user is logged off the game network. If the user is not done playing, control passes to step S408 where the player selects a game from the plurality of available games or takes another action such as accessing a help menu or accessing a score report showing the score and current ranking. The player, upon returning to step S408, can elect to play a different game or the same game as previously played.

In reference to FIG. 8, at the end of the competition period, in this case the end of week N 304, the competition is ended. At a subsequent time 812 the normalized game credits are examined and winners are determined within each player group. Players are ranked within their player group according to the average of their normalized game score as long as they have played a minimum number of games in any combination. For example, a particular player may play a single game five or more times to qualify as a competitor within their assigned player group. Alternatively, a player may elect to play five or more different games, each producing a normalized game score, in order to qualify as a competitor in their player group.

The top players of each player group are awarded cash prizes in an amount that is distributed based on their ranking. Preferably the top ten players of each player group of fifty win cash prizes by dividing a prize pool established for the competition period. The prize pool can be determined as a percentage of a gaming access fee paid by each user (whether playing or not), or the prize pool can be a fixed amount established by the gaming system manager. An overlay prize pool includes the top five players from all of the player groups, with the top ranked player of all the player groups being awarded a relatively large cash prize based either on a percentage of the gaming subscription fee paid by each user, or a prize established by the interactive gaming system manager.

For example, the top ranked player from all of the player groups could be awarded a cash prize of $1,000 while the 2nd through 5th top ranked players each divide another $1,000 cash prize in a manner pre-determined by the gaming system manager. Additional prize pools may be formed based upon an additional prize subscription fee paid by users who wish to compete for larger prize pools. Additional prize pool amounts can be supplied by different gaming subscription fees.

Figure 9:
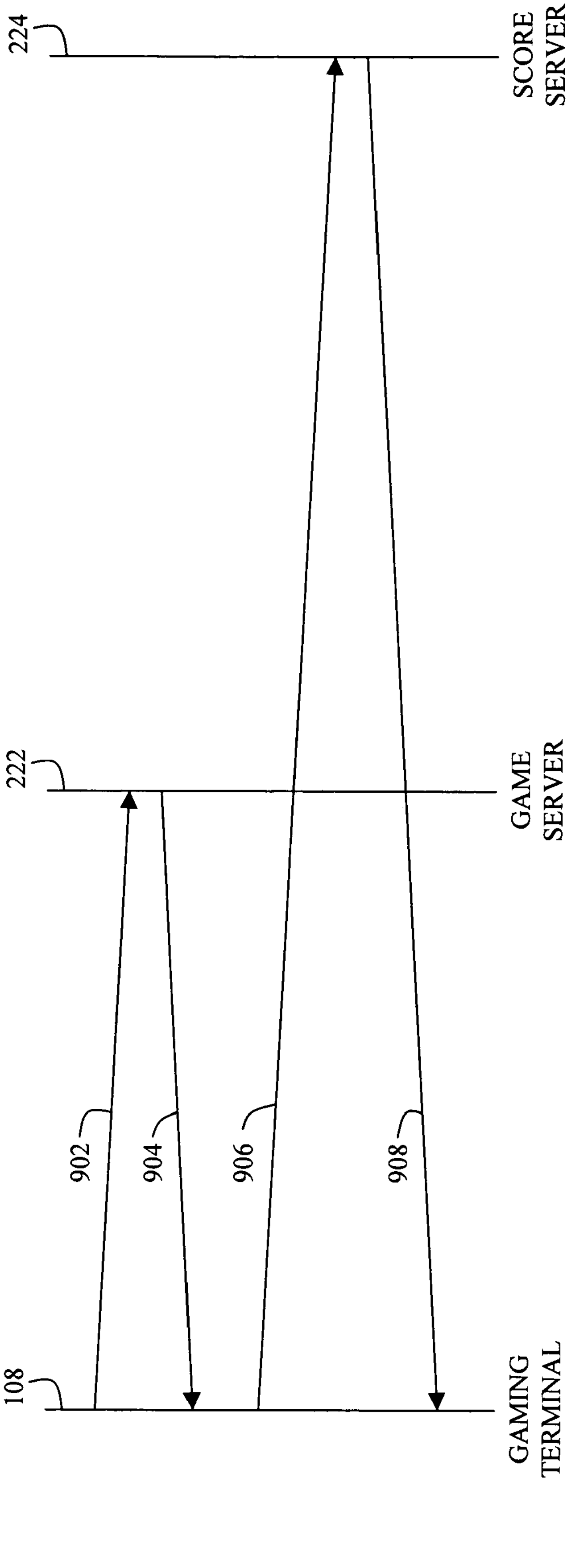
FIG. 9 illustrates some of the transactions between a gaming terminal and the game management system in accordance with an embodiment of the present invention.

FIG. 9 illustrates some of the transactions between a gaming terminal 108, the game server 222, and the score server 224 as described relative to the steps of FIG. 4. Once a user is logged onto the system and assigned to a player group, the player selects a game from the game server in step S408. This is illustrated in FIG. 9 as transaction 902 where one of the users 102 operates the gaming terminal 108 to send an upstream signal 124 to requests a selected game from a predetermined list of games available on the interactive gaming system 200.

Once the game management system 202 receives the request for the selected game, the game server 222 replies to the gaming terminal 108 by sending an executable version of the selected game in transaction 904 in a downstream signal 122 corresponding to step S410. This executable version is preferably a program that will run on a gaming terminal 108 processor such as on the network communication unit 114, as described above.

Once the selected game is downloaded, control passes to step S412 where the game is played and a raw player score is produced. Once the raw player score is produced, it is sent to the game management system 202 and ultimately to the score server 224 in a transaction 906 in an upstream signal 124 corresponding to step S412. Since the score credit history information for all players is stored on the score server 224, it is preferable to forward the raw player score to the score server in order to compute the score credits and the normalized game points including the handicap corresponding to step S414.

Alternatively, some portion of the computations may be completed by the gaming terminal 108 while the remainder may be accomplished by the game management system 202 including the score server 224. Once the score credits and normalized game points or game credits are computed, they are stored appropriately in the score server 224 and also reported to the user 102 via the user output unit 118 by the transaction 908 in a downstream signal 122 from the score server 224 to the gaming terminal 108. A transaction that predominantly includes sending upstream data is considered to be uploading the upstream data. Similarly, a transaction that predominantly includes receiving downstream data is considered to be downloading the downstream data.

The interactive gaming system 200 includes a bidirectional communication network 126. The bidirectional communication network can include a cable modem, a digital subscriber line modem, and a satellite modem connection or any combination of these or similar communication elements. Often a communication network can include disparate elements with varying bandwidth capabilities.

The games available on the game server 222 are deliverable based on a number of different techniques that include Point-to-Point (PPP) availability, or carousel (endlessly repeating) availability. In the case of PPP availability, a gaming terminal 108 makes a request of the game server 222 to download a selected game to the gaming terminal 108. This is possible in a bidirectional network such as the internet where a direct request/response protocol is implemented. However, in the case where the downstream channel is satellite TV and the upstream channel is a telephone back-channel, the requests can be substantially delayed, in essence time-shifted.

Figure 10:
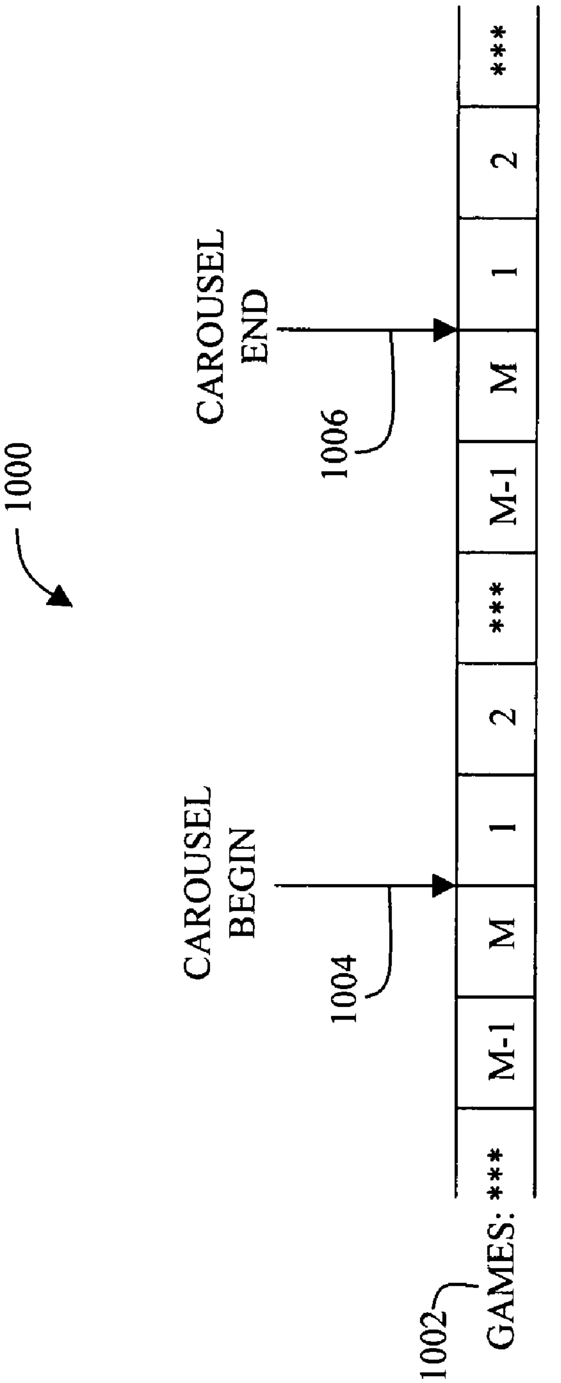
FIG. 10 shows a carousel distribution of games in accordance with an embodiment of the present invention.

In reference to FIG. 10, in a carousel 1000, the games are distributed based on an endlessly repeating broadcast of available games over a data channel and the gaming terminal 108 simply waits for the selected game to be broadcast and downloads the selected game. Each game is positioned in a known order in the broadcast, so the gaming terminal 108 simply waits until the proper broadcast time to capture the selected game.

For example, a series of games 1002 are broadcast in a particular order from 1 to M. The carousel is endlessly repeating on the particular channel and has a begin carousel 1004 and an end carousel 1006. A carousel distribution can be used for any distribution channel due to the lower complexity of continuously broadcasting the repeating data, but is especially suitable for a satellite based downstream where there is limited or non-interaction with the broadcasting terminal. Conversely, the PPP distribution can be used for an internet or cable based gaming system 200 where the gaming terminals (108, 202, 204) can request a particular file or set of files from a particular resource, such as a file server on the network. Although requesting and responding to requests increases complexity, the advantage is a lower overall bandwidth requirement compared with a continuous allocation of bandwidth for a carousel broadcast, as described above.

FIG. 19 shows an example main menu 1902 displayed to a user on a user output unit 118. The main menu 1902 is divided into different regions. Region 1904 shows an indication of the menu type being a main menu, and a greeting to an example user named COWGIRL indicating an alias for the unique user account offered by the user during the log in process. Region 1906 indicates a sample screen from an available game, in this case corresponding to the region 1918 for WORD GAMES. The user can manipulate the user input unit 104 to select one of the available menu choices including the games listed in region 1908 to region 1922. If the user selects region 1924 LOGOUT, the user will terminate their active session with the interactive gaming system 200. If the user selects region 1926 SCORE/RANK, the user will be presented with a view of their current score and rank within their player group. If the user selects region 1928 HELP, the user will be presented with a help menu showing alternatives for gaining assistance from either the call center personnel, by accessing Frequently Asked Questions (FAQs), or by accessing game specific information, for example. If the user selects region 1930 BACK, the user is presented with a view of the previous menu displayed. Through the selection of predetermined regions of the display screen, a user is enabled to traverse the display menus, access resources, and play selected games in the interactive gaming system 200, for example.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A method of scoring an interactive network of games to determine a winner from a plurality of players, competing in a competition against each other, and each of the plurality of players subjectively selecting from a plurality of games of different types of play, one or more games to provide the players' score, by computing a non-game-specific game credit for each game-play event of any selected game from the plurality of games, using a raw score value from the play of the selected game, comprising the steps of:

calculating a non-game-specific score credit for each game-play event of the selected game from the raw game score to the exclusion of any game specific characteristic other than any previous raw game score values from the play of the selected game;

calculating a non-game-specific handicap value, for each game-play event of the selected game using only the non-game-specific score credit values, the non-game-specific handicap value is a generic handicap value that applies to a subsequent game of a different type of play;

adding the non-game-specific score credit and the non-game-specific handicap together to produce a non-game-specific game credit; and comparing the non-game specific game credits of each of the plurality of players to determine a winning player.

2. The method of claim 1, the step of calculating a non-game-specific score credit for the selected game comprising:

retrieving a history of player raw game score values for all previous players of the selected game over a predetermined period of time defining a plurality of historical raw game score values;

ranking the plurality of historical raw game score values for the selected game to produce an ordered list of historical raw game score values from lowest to highest value; and comparing a player raw game score value with the ranked historical raw game score values to determine a percentage of historical raw game score values below the player raw game score value defining the non-game-specific score credit.

3. The method of claim 1, the step of calculating a non-game-specific handicap value comprising:

retrieving the player's current and previous non-game-specific score credits during competition for each game played;

selecting the player's single highest non-game-specific score credit regardless of the type of game;

subtracting the players highest non-game-specific score credit from a predetermined maximum non-game-specific score credit to determine a raw handicap value; and computing a fraction of the raw handicap value using a predetermined scaling factor to produce the non-game-specific handicap value for the competition.

4. The method of claim 3, wherein the maximum non-game-specific score credit is one hundred.

5. The method of claim 3, wherein the predetermined scaling factor of the raw handicap value is one selected from the group of fractions 19/20, 9/10, 4/5, and 3/4.

6. A method of computing scores and determining a winner between a plurality of players subjectively playing a plurality of different types of games in a competitive event, comprising the steps of:

selecting a first game from the plurality of different types of games for a first player;

playing the selected first game to produce a first player raw game score value for the first player;

calculating a first non-game-specific score credit from the first player raw game score value and a history of past raw game score values of all players of the selected first game, the first non-game-specific score credit being a percentage of past raw game score values below the first player raw game score value;

selecting a second game different from the first game from the plurality of different games for a second player;

playing the selected second game to produce a raw game score value for the second player;

calculating a second non-game-specific score credit from the second player raw game score value and a history of past raw game score values of all players of the selected second game, the second non-game-specific score credit being the percentage of past raw game score values below the second player raw game score value;

calculating a first player generic handicap that is applicable to each of the plurality of different types of games;

adding a first player generic handicap value to the first non-game-specific score credit to determine a first non-game-specific game credit;

calculating a second player generic handicap that is applicable to each of the plurality of different types of games;

adding a second player generic handicap value to the second non-game-pecific score credit to determine a second non-game-specific game credit;

comparing the first non-game-specific game credit with the second non-game-specific game credit; and selecting one of the. first player and the second player as the winner, the winner having the higher of the first non-game-specific game credit and the second non-game-specific game credit, wherein each of the first player and the second player having played a different game.

7. The method of claim 6, further comprising:

averaging a plurality of first non-game-specific game credits to determine an average first non-game-specific game credit for the first player;

averaging a plurality of second non-game-specific game credits to determine an average second non-game-specific game credit for the second player; and selecting one of the first player and the second player as the winner, the winner having the higher of the average first non-game-specific game credit and the average second non-game-specific game credit, each of the first player and the second player having played a plurality of different games.

8. The method of claim 7, wherein the averaging of the non-game-specific game credits for each of the first player and the second player is performed by only using non-game-specific game credits calculated over a predetermined competition period.

9. The method of claim 7, further comprising:

rewarding the selected winner by awarding a prize.

10. A method of determining a winning player from a plurality of players, selecting and playing one or more games from a plurality of games of a different type from one another, over an Interactive gaming system, comprising the steps of:

assigning a predetermined number of players to form an assigned group of players for a competition;

providing a predetermined number of games of different types that can be individually selected for playing and recording raw game scores for each game played by the assigned players in the assigned group;

requiring the assigned players to play a predetermined minimum number of games from the predetermined number of games of different types provided to the assigned group to qualify as candidates to be determined as a winning player;

storing the raw game scores of each player for each game played;

determining from the raw games score value of a player, measured relative to past raw score values of other players for the selected game, a non-game specific score credit for each game played;

determining a generic handicap value for each game played for each player, from the non-game specific score credits earned by each of the plurality of qualified players for each game played by each player; wherein the generic handicap value applies to each of the plurality of games of a different type;

computing a non-game-specific game credit based on a summation of the player's generic handicap value and the player's non-game specific score credit;

comparing average non-game specific game credits for each player in the assigned group;

determining a winning player based on the highest average non-game specific game credit; and providing a reward to the winning player.

* * * * *